US012243371B2

(12) United States Patent
Chen

(10) Patent No.: US 12,243,371 B2

(45) Date of Patent: Mar. 4, 2025

(54) VENDING MACHINE

(71) Applicant: Edward Chen, Shanghai (CN)

(72) Inventor: Edward Chen, Shanghai (CN)

( * ) Notice: Subject to any disclaimer, the term of this patent is extended or adjusted under 35 U.S.C. 154(b) by 404 days.

(21) Appl. No.: 17/736,425

(22) Filed: May 4, 2022

(65) Prior Publication Data

US 2022/0262191 A1 Aug. 18, 2022

Related U.S. Application Data

(63) Continuation-in-part of application No. 16/568,389, filed on Sep. 12, 2019, now abandoned.

(51) Int. Cl.

*G07F 11/72* (2006.01)
*G07F 9/00* (2006.01)
*G07F 9/10* (2006.01)
*G07F 11/16* (2006.01)
*G07F 17/00* (2006.01)

(52) U.S. Cl.

CPC .......... *G07F 17/0078* (2013.01); *G07F 9/006* (2013.01); *G07F 9/105* (2013.01); *G07F 11/1657* (2020.05); *G07F 11/72* (2013.01)

(58) Field of Classification Search

CPC .................................................. G07F 17/0078
USPC .................................................. 221/150 HC
See application file for complete search history.

(56) References Cited

U.S. PATENT DOCUMENTS 6,412,654 B1 * 7/2002 Cleeve .................. G07F 9/0235 221/133
8,386,074 B2 * 2/2013 Smith, III ............... G07F 11/36 221/96
8,989,893 B2 * 3/2015 Jones ....................... A23G 9/22 221/24
2004/0178213 A1 * 9/2004 Martinelli .............. H05B 6/808 221/150 R
2008/0272142 A1 * 11/2008 Chirnomas ............. G07F 11/14 221/282
2009/0200295 A1 * 8/2009 Beausse ............... H05B 6/6402 219/733
2015/0101968 A1 * 4/2015 Yoon ....................... C02F 1/325 210/97

* cited by examiner

*Primary Examiner* — Gene O Crawford
*Assistant Examiner* — Ayodeji T Ojofeitimi
(74) *Attorney, Agent, or Firm* — Clement Cheng

(57) ABSTRACT

An automatic vending machine has a control unit controlling a payment unit. The payment unit is configured to receive payment from a user. The refrigeration unit is a chest freezer having a top lid and a hinge. The top lid is controlled by the control unit. The top lid moves between an open position and a closed position. A food package is stored in the refrigeration unit. A picking arm is mounted on a picking arm swivel. The picking arm has a pick suction tip that is vacuum driven. The picking arm is controlled by the control unit. The control unit is configured to control the picking arm to pick a food package from the refrigeration unit and move it to the microwave heating unit for heating.

9 Claims, 5 Drawing Sheets

VENDING MACHINE

The present invention is a continuation in part of U.S. patent application Ser. No. 16/568,389 entitled Vending Machine filed Sep. 12, 2019, by inventor Edward Chen, which in turn claimed priority from China utility model application entitled Vending Machine filed Dec. 21, 2018 with serial number 201822165913.5, the disclosures of which are incorporated herein by reference.

FIELD OF THE INVENTION

The present invention relates to refrigerated vending machines having food heating functions.

DISCUSSION OF RELATED ART

Vending machines, also known as 24-hour micro-unmanned supermarkets, are common commercial automation equipment. Vending machine operating hours are not limited, which saves manpower and facilitating transactions. Common vending machines currently include beverage vending machines, food vending machines, integrated vending machines, cosmetic vending machines, and the like.

Existing vending machines with refrigeration have a food storage temperature mostly above 0° C., which allows a short food storage time, which requires replenishment more often. Foods, especially meat-like foods, need to be stored at −18° C. or less to obtain a longer preservation time. Traditional heated food vending machines sets the heating unit and the freezing unit into the same area within one housing body. When a certain food is sold, the food is heated in the heating unit in the same area. The heat generated by such heating causes temperature fluctuations in the freezing zone and affects the safe storage period of the food. In addition, if the meat-based foods are kept below −18° C., the food cannot be quickly heated to a suitable human eating temperature in a short time using the existing conventional heating method, and the food selling speed is low, which is not conducive to the fast food of the vending machine sales.

Therefore, in the prior art, there are few vending machines for selling meat snacks such as hamburgers and pizzas, and in particular, vending machines for foods having a freezing temperature of −18° C. or lower.

SUMMARY OF THE INVENTION

An automatic vending machine for heated hamburgers includes an operation panel unit, a refrigeration unit, a microwave heating unit, a transmission unit, a control unit, a charging unit, a receipt printing unit and a communication unit. This machine overcomes the deficiencies of traditional heated vending machines, and provides automatic vending of meat food such as hamburgers, in particular, a sub −18° C. refrigerating unit and a microwave rapid heating unit are provided to present the hamburger and provide automatic rapid heating and vending of meat products. At the same time, a cloud management platform is adopted, which can remotely collect, monitor and control the vending machine through the background system.

An object of the present invention is to separate the food freezing unit from the food heating unit. This ensures optimum food storage temperature, while allowing automatic sales and vending with rapid heating. The invention can also be used in cargo aircraft. A conveying mechanism transfers the food from freezing zone to the heating zone, and then rapidly heats the food, thereby accelerating the production speed of the food and vending speed.

The vending machine includes a vending machine body which includes: a control unit that controls operation; a freezing unit that stores food and freezes the stored food; a heating unit that receives the food and heats the received food; and an isolation module that thermally isolates the heating unit from the freezing unit; a transport unit configured to transfer food from the freezing unit to the heating unit; and a picking unit that takes and takes out food from the vending machine body. The freezing unit, the heating unit, the conveying unit, and the picking unit are all in data communication with the control unit.

Compared to prior art, heat from of the heating unit is separated from the freezing unit area to avoid freezing unit area temperature fluctuation from affecting the temperature fluctuation of the freezing unit area. The isolation module can thermally isolate the freezing unit from the heating unit, reduce heat transfer between the two, and improve the freezing capacity of the freezing unit, thereby improving the safe storage period of the food.

The freezing unit has a freezing chamber and a compressor, and the compressor compresses refrigerant to control the temperature in the freezing chamber to −18° C. or lower. According to this preferred embodiment, the temperature of the freezing chamber is controlled to −18° C. or lower by the compressor, and microorganisms can be effectively suppressed to maintain the food nutrition.

An ozone sterilization module is optionally disposed in the freezing unit. According to the preferred embodiment, the food in the freezing unit is sterilized and disinfected by using ozone to ensure the safety of the food. Ozone sterilization, sterilization is rapid and efficient, and the oxides produced during the sterilization process are non-toxic and tasteless, and will not cause secondary pollution.

The heating unit includes a closed heating chamber, a magnetron for heating, and a cooling module for magnetron cooling. According to this preferred embodiment, the microwave is generated by the magnetron, and the food located in the heater is heated to shorten the heating time. Further, preferably, there are two magnetrons, and the two magnetrons are preferably disposed at the top and the bottom of the heating chamber.

Further, preferably, the cooling module is an air cooling module or a water cooling module. Water is preferred due to high water specific heat capacity absorbing more heat. The water cooling can quickly and effectively cool the magnetron, and the cooling efficiency is high.

The transport unit preferably includes a transport stage, a first drive mechanism, and a first push mechanism configured to be capable of receiving food, the first drive mechanism being configured to be capable of driving the transfer of the transfer station, and the first pushing mechanism is configured to be capable of pushing food on the transfer table into the heating unit.

According to the preferred embodiment, the food is taken up by the transfer table, and the food is pushed into the heating unit by the first pushing mechanism. The food on the transfer table is only supported by gravity and the conveying table, and the food is not affected by the external force. No deformation occurs to keep the shape of the food intact and beautiful.

Further, preferably, the vending machine further includes a payment unit including a button for food selection and/or an operation screen for displaying food information for selecting a food. The payment unit has a cash collection port and/or electronic scan code payment code.

According to the preferred solution, the food can be selected by using a button or an operation screen, and the payment can be completed by means of cash or electronic payment. The selection and payment methods of the food are various and simple, and are convenient for the user to purchase.

In addition, preferably, the picking unit includes a second pushing mechanism and a picking port, the picking port is adjacent to the heating unit, and the second pushing mechanism is configured to be capable of pushing the food in the heating unit to the pick-up port.

According to the preferred solution, the pick-up port is arranged close to the heating unit, which facilitates pushing the heated food to the pick-up port, simplifies the work of the second push mechanism, and speeds up the food delivery efficiency.

The automatic heating vending machine includes: an operation panel unit, a refrigeration unit, a microwave heating unit, a transmission unit, a control unit, a communication unit, a charging unit, and a receipt printing unit. The temperature of the refrigerating unit is set at −18° C. or lower than −18° C., for storing hamburgers. The conveying unit is used for automatically conveying the hamburgers in the refrigerating unit to the microwave heating cavity. Its microwave heating unit is used to heat the hamburger sent to the microwave heating cavity, including a closed microwave heating cavity and three sets of self-cooled magnetrons. The input power of the microwave heating unit is not less than 3500 W.

The wave heating time is preferably less than 60 seconds. The refrigeration unit and the microwave heating unit are distributed in different areas. At the same time, a cloud management platform is adopted, which can remotely collect, monitor and control the vending machine through the background system. The charging unit is used for customers' swiping card or scanning code payment. The receipt printing unit provides printing of sales lists.

In addition, preferably, the control unit is further connected to a remote monitoring unit by using a communication module, and the communication module sends the information collected by the control unit to the remote monitoring unit, and the remote monitoring unit is controlled by a background system. The vending machine information is collected, monitored and controlled.

According to the preferred solution, by setting a remote monitoring unit, the remote collection, monitoring and control of the vending machine is realized through the background system, and the intelligent operation of the computer system is maximized, the automation and efficiency of the management are improved, and the monitoring cost is reduced.

SUMMARY OF THE CLAIMS

An automatic vending machine has a control unit controlling a payment unit. The payment unit is configured to receive payment from a user. The refrigeration unit is a chest freezer having a top lid and a hinge. The top lid is controlled by the control unit. The top lid moves between an open position and a closed position. A food package is stored in the refrigeration unit. A picking arm is mounted on a picking arm swivel. The picking arm has a pick suction tip that is vacuum driven. The picking arm is controlled by the control unit. The control unit is configured to control the picking arm to pick a food package from the refrigeration unit and move it to the microwave heating unit for heating.

The food package moves to the pickup area after being heated. The pickup area has a pickup port for dispensing to a user. The communication unit provides remote monitoring and wirelessly monitors the payment unit, refrigeration unit, microwave heating unit, the picking arm, and the control unit. The hinge opens with a linear motor mounted on a freezing unit sidewall of the chest freezer, wherein the control unit is configured to control the motion of the linear motor.

The control unit sets the temperature of the refrigeration unit at less than or equal to −18° C. The refrigeration unit is mounted on a cold side and the microwave heating unit is mounted on a hot side, wherein the cold side and the hot side are separated by an isolation module. The isolation module is formed as an insulated wall. The insulated wall has a partition door opening formed through the insulated wall. A partition door is mounted to the partition door opening. The picking arm swivel is configured to send the food package through the partition door opening into the microwave heating unit.

The partition door is spring-loaded and automatically closes after the food package passes through the partition door opening. The microwave heating unit is formed with a closed microwave heating cavity. The closed microwave heating cavity has set of magnetrons. The set of magnetrons includes a first magnetron, a second magnetron and a third magnetron. The total power of the three magnetrons is more than 3500 watts of power, and a microwave heating time is less than 60 seconds. The control unit is configured to control the picking arm to not only automatically move the food package from the refrigeration unit to the microwave heating chamber, but to also move the food package after heating to the pickup area.

Figure 1:
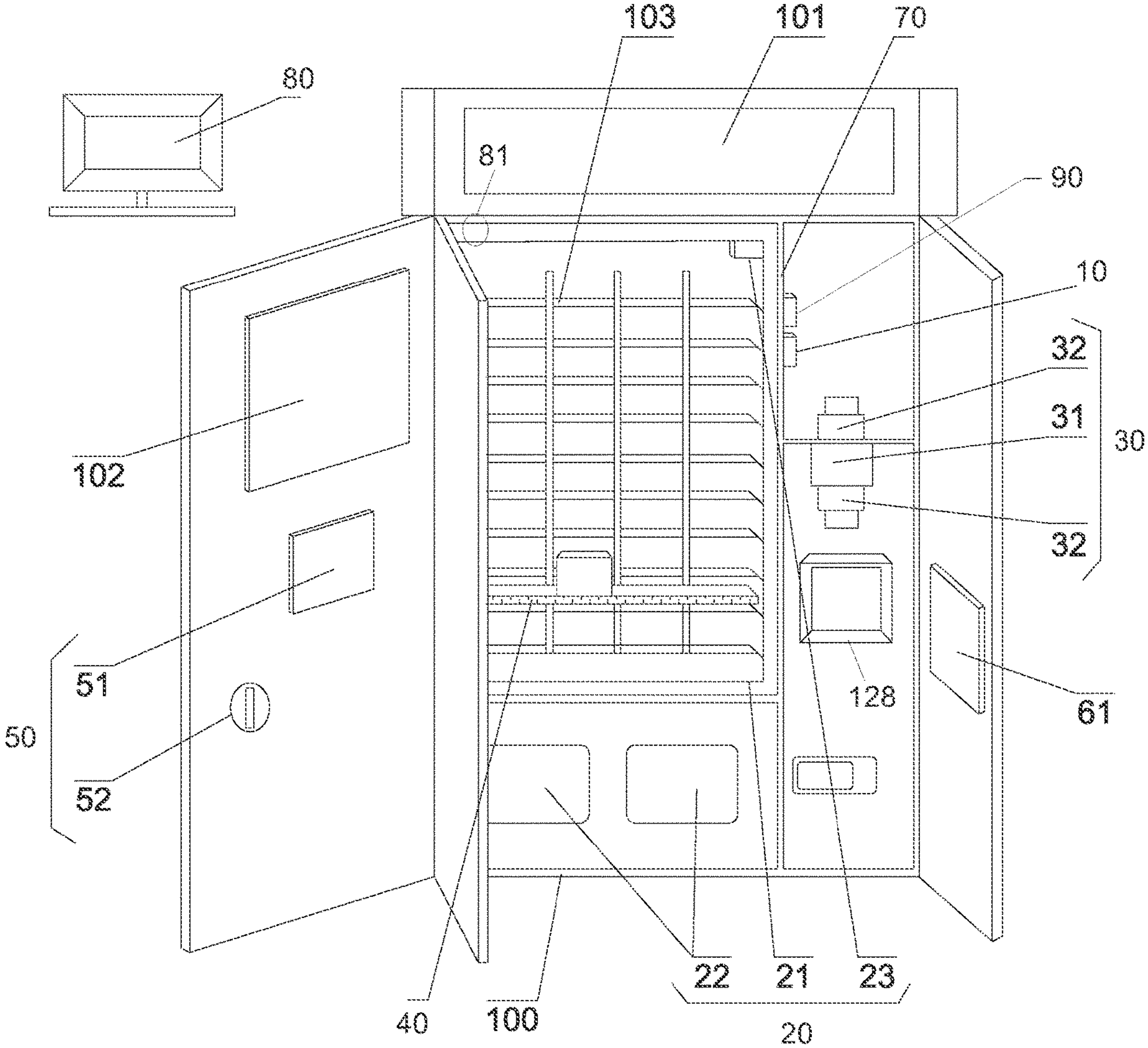
FIG. 1 is a side view of an embodiment of the present invention with the front doors open.

The following callout list of elements can be a useful guide in referencing the element numbers of the drawings.

100 Vending Machine Main Body
101 Light Box
102 Advertising Screen
103 Cargo Lane
104 First Conveyor Belt
10 control unit
11 fuse
20 Freezing Unit
21 Freezing Chamber
22 Compressor
24 lid
25 hinge
26 freezing unit sidewall
27 linear motor
30 heating unit
31 Heating Chamber
32 Magnetron
33 heating chamber upper opening
34 first magnetron 35 second magnetron
36 third magnetron
37 flat plate
38 heating chamber funnel
39 heating chamber front door
40 Conveying Unit
41 Transport Table
42 First Drive Mechanism
43 First Push Mechanism
44 Second Conveyor
50 payment unit
51 Operation Screen
52 Cash Collection Port
53 receipt printer
60 Pick-Up Unit
61 Pick-Up Port
62 Second Push Mechanism
63 pickup port hatch
70 Isolation Module
71 right door
72 left door
73 cover door
74 partition door
75 partition door opening
80 Remote Monitoring Unit
81 camera
88 food package
90 communication module
120 conveyor belt
121 picking arm
122 pick section tip
123 picking arm swivel
128 pickup area

DETAILED DESCRIPTION

The present invention will be further described in detail below with reference to the accompanying drawings. The structure and the like of the vending machine are schematically simplified in the drawing.

Embodiments of the present invention provide a vending machine, as shown in FIG. 1, including a vending machine body 100 having a light box 101 and an advertising screen 102 for illumination and advertising. The kiosk main body 100 is provided with a control unit 10, a freezing unit 20, a heating unit 30, a conveying unit 40, a payment unit 50, and a pickup unit 60. Wherein, the control unit 10 can control the operation of the vending machine; the freezing unit 20 can store the food and freeze the stored food; the heating unit 3 can receive the food and heat the received food; and the conveying unit 40 can transfer the food from the freezing unit 20 to the heating unit 30; the payment unit 50 is capable of the user selecting the food and paying; the picking unit 60 is capable of taking and taking out the food from the vending machine main body 100. The heating unit 30 and the freezing unit 20 are thermally isolated by the isolation module 70, and in particular, the isolation module 70 is a polyurethane insulation panel. The freezing unit 20, the heating unit 30, the conveying unit 40, the payment unit 50, and the pickup unit 60 are all in communication connection with the control unit 10.

Compared with the prior art, the vending machine provided by the present invention can prevent the temperature fluctuation of the freezing unit 20 from affecting the temperature fluctuation of the heating unit 30 by setting the freezing and heating isolation of the food and separately, thereby improving the food's safe storage period. The isolation module 70 can thermally isolate the freezing unit 20 from the heating unit 30, reduce heat transfer between the two, improve the freezing capacity of the freezing unit 20, and thereby improve the safe storage period of the food.

Referring to FIG. 1, the freezing unit 20 includes a freezing chamber 21 and a compressor 22 that compresses refrigerant to control the temperature in the freezing chamber 21 to −18° C. or lower. The freezing unit 20 also includes a condenser, an evaporator, an air deflector, etc., which are common devices in compression refrigeration, which are not shown in the drawings for the sake of simplicity. The temperature of the freezing chamber 21 is controlled to −18° C. or below, and the original quality of the food is preserved at a low temperature such that, for example, water, juice, etc. in the food tissue are not lost, and microorganisms are effectively inhibited without any preservatives and additives. At the same time, the food nutrition is preserved to the utmost extent, and the food has the advantages of deliciousness, convenience, health, hygiene, nutrition and benefits, and the food is safe.

Referring to FIG. 1, an ozone sterilization module 23 is further disposed in the freezing unit 2 to sterilize and disinfect the food in the freezing unit 20 by using ozone to ensure the safety of the food. Ozone sterilization is rapid and efficient, and the oxides produced during the sterilization process are non-toxic and tasteless, and will not cause secondary pollution. Referring to FIG. 1, the heating unit 30 includes a closed heating chamber 31, a magnetron 32 for heating, and a cooling module for cooling the magnetron 32. For example, two magnetrons 32, can be disposed at upper and lower positions of the heating chamber 31. Microwaves can be generated by the magnetron 32 to microwave the food located in the heater.

Specifically, there are two magnetrons 32, and two magnetrons 32 are disposed at the top and bottom of the heating chamber 31. The two magnetrons 32 disposed above and below enable the temperature inside the heating chamber 31 to rise rapidly, so that the food in the heating chamber 31 can be quickly heated. The heating unit 3 has the advantages of uniform heating, high speed, selective heating, strong heat penetration capability, etc., which can shorten the heating time, improve the food manufacturing efficiency, and improve the product quality.

Water has a higher specific heat capacity and can absorb more heat. Therefore, the cooling module is provided as a water-cooling module, and the magnetron 32 is quickly and effectively cooled by water cooling, and the cooling efficiency is high. In other embodiments, the cooling module can also be an air cooled module or any other module that can effect cooling of the magnetron 32.

Figure 2:
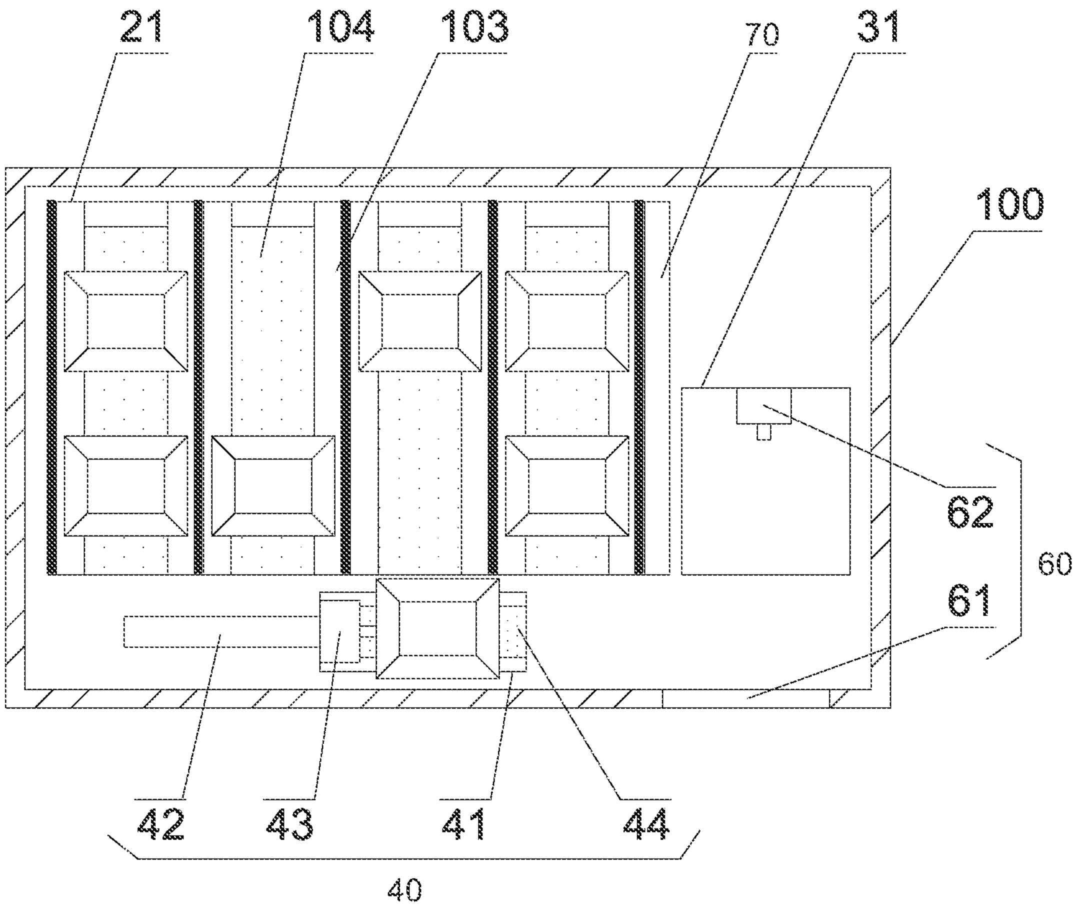
FIG. 2 is a schematic structural view of a horizontal cross section of an embodiment of the present invention.

Referring to FIG. 2, the freezing unit 20 also has a plurality of cargo lanes 103, each of which is capable of receiving a plurality of food items. The receiving surface of the cargo lane 103 is provided with a first conveyor belt 104. When it is necessary to purchase the food at a certain cargo lane 103, the first conveyor belt 104 operates to transport the food product toward the opening of the cargo lane 103 until the food product near the opening falls onto the conveying unit 40.

As shown in FIGS. 1 and 2, the conveying unit 40 includes a transport table 41, a first drive mechanism 42 and a first push mechanism 43, the transport table 41 is capable of receiving food, and the first drive mechanism 42 is configured to be capable of driving the position of the transport table 41. In the transfer, the first pushing mechanism 43 can push the food on the transfer table 41 through door 63 into the pickup unit 60, which is capable of lifting the food vertically into heating unit 3. The food is taken up by the transport table 41, and when the food is pushed into the heating unit 3 by the first pushing mechanism 43, the food on the transport table 41 is only subjected to the gravity and the support force given by the transport table 41, and the food is not affected by the external force. No deformation occurs to keep the shape of the food intact and beautiful. The first pushing mechanism 43 may be a linear motor, a cylinder assembly or a screw assembly, or the like.

The first driving mechanism 42 is a two-axis linkage mechanism, and the first driving mechanism 42 can drive the up and down and left and right movements of the transport table 41. The receiving surface of the transport table 41 is provided with a second conveyor belt 44. When the transport table 41 is moved to the heating unit 30, the second conveyor belt 44 operates to transport the food toward the heating unit 30, reducing the force of the first pushing mechanism 43 that was pushing the food to protect the shape of the food.

Referring to FIG. 1, in the present embodiment, the payment unit 50 includes operation screen 51 and a cash collection port 52. The operation panel 51 can display the type, price, and the like of the food. The user can select the product on the operation screen 51 and select the product. The cash is then paid through the cash collection port 52, or the payment code is generated on the operation screen 51, and electronic payment is performed using an electronic device such as a mobile phone. In other embodiments, the payment unit 50 may also include a button and a scan code payment code, the user selects the food through the button, and scans the code for electronic payment. Of course, the operation screen 51 may be combined with the scan code payment code, the cash collection port 52 may be combined with the button, or only the operation panel 51 or the like may be provided as long as the selection and payment of the food can be realized. The food can be selected by using the button or the operation screen 51, and the payment can be completed by cash or electronic payment. The selection and payment method of the food is simple and diverse, and is convenient for the user to purchase.

As shown in FIG. 1 and FIG. 2, the pickup unit 60 includes a pick-up port 61, and the pick-up port 61 is adjacent to the heating unit 30, so as to facilitate pushing the heated food to the pick-up port 61, simplifying the work of the second pushing mechanism 62 to speed up the efficiency of food shipments. The pickup unit 60 further includes a second pushing mechanism 62 capable of pushing the food to the pickup port 61. The second pushing mechanism 62 may be a linear motor, a cylinder assembly or a screw assembly, or the like.

Referring to FIG. 1, the control unit 1 is also communicably connected with a remote monitoring unit 8 by using a communication module 90, and the communication module 90 transmits the information by the control unit 1 to the remote monitoring unit 80, and the remote monitoring unit 80 is controlled by a background system, such as a computer system implemented on one or more host servers each of which having their own system memory, processors and communications interface. The remote monitoring unit 80 works remotely through the background system to monitor and control the vending machine. The communication module 90 may be a modem, a wired or wireless network interface (e.g. an Ethernet card), a communications port or the like. By setting up the remote monitoring unit 8, the remote collection, monitoring and control of the vending machine can be realized through the background system, and the intelligent operation of the control unit computer system can be maximized to improve the automation and efficiency of the management and reduce the monitoring cost. The communication module 90 can also be used for interactive communication between the cloud management platform and a computer application, and the operator can remotely collect the sales information, monitor the device status, and control the operation or stop of the vending machine through the background system.

The automatic vending machine can sell package food such as burgers that are frozen at −18° C. or lower than −18° C. in a chest freezer and the burgers can be heated at a microwave heating unit capable of rapidly heating the hamburgers. Preferably, the vending machine has a cloud management platform that remotely, collects, monitors and controls the vending machines through a backend system. The cloud management platform enabled by the communication module 90 allows the communication module 90 monitor and manage the operation panel unit 51, a refrigeration unit 20, a microwave heating unit 30, the conveyor belt 120, the control unit 10, and the payment unit 50. The payment unit 50 can process card or code payments such as cell phone QR code payments. Optionally, a receipt printer 53 can provide a receipt for the user, or the user can receive an email receipt.

Figure 3:
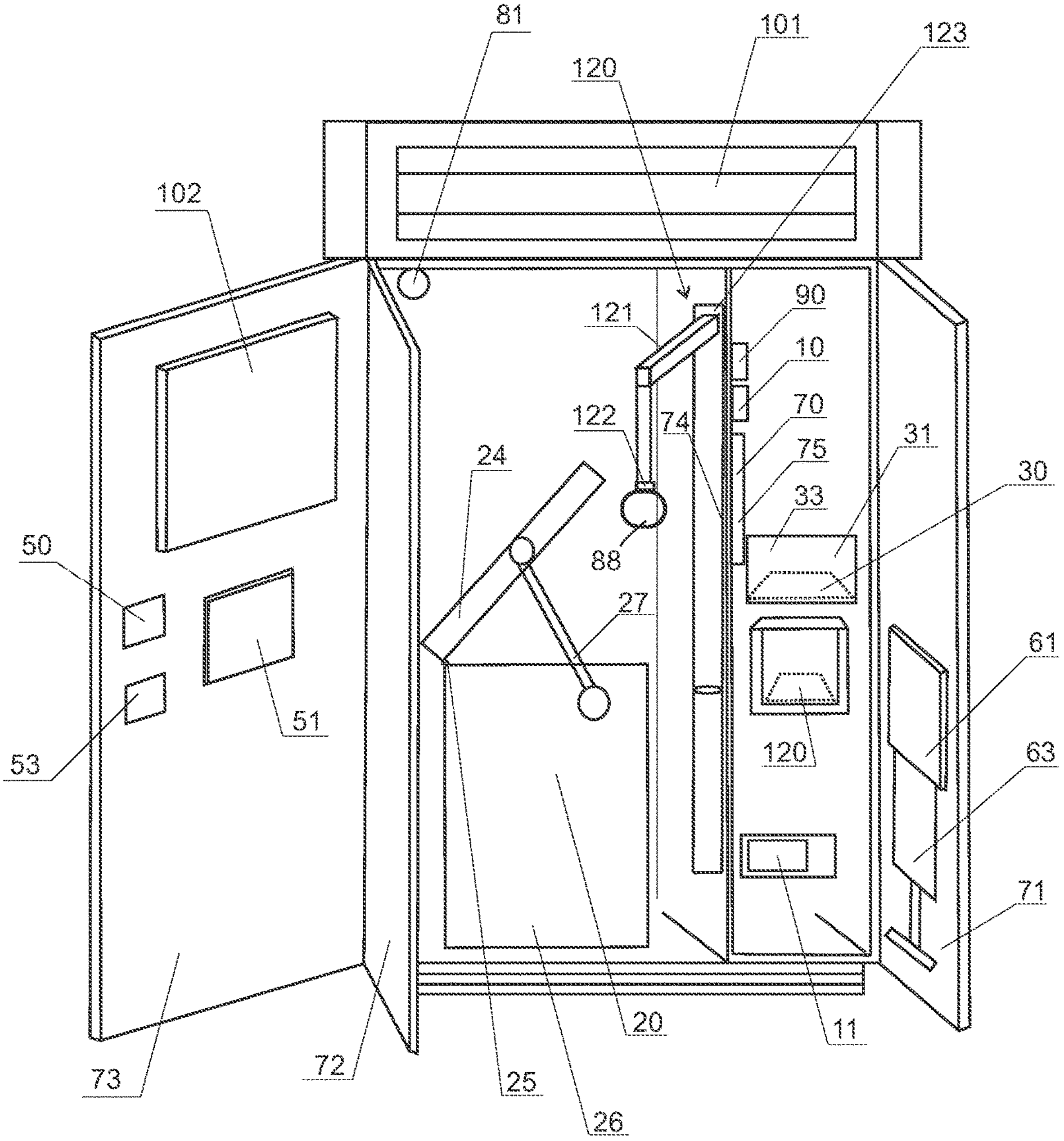
FIG. 3 is a diagram of the chest freezer embodiment of the present invention.
Figure 4:
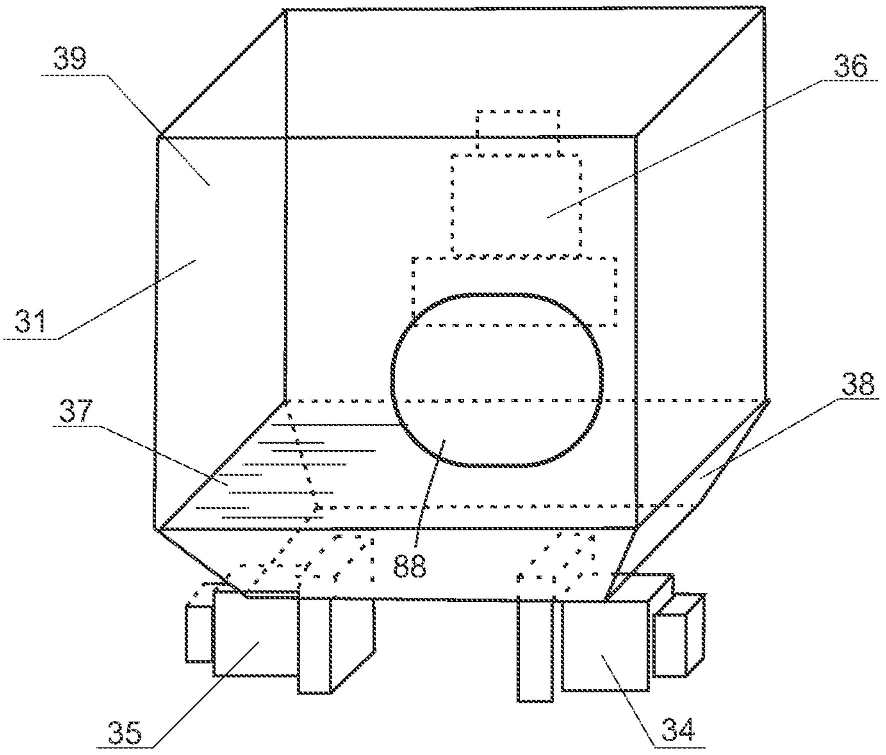
FIG. 4 is a diagram showing the food heating magnetron chamber area.
Figure 5:
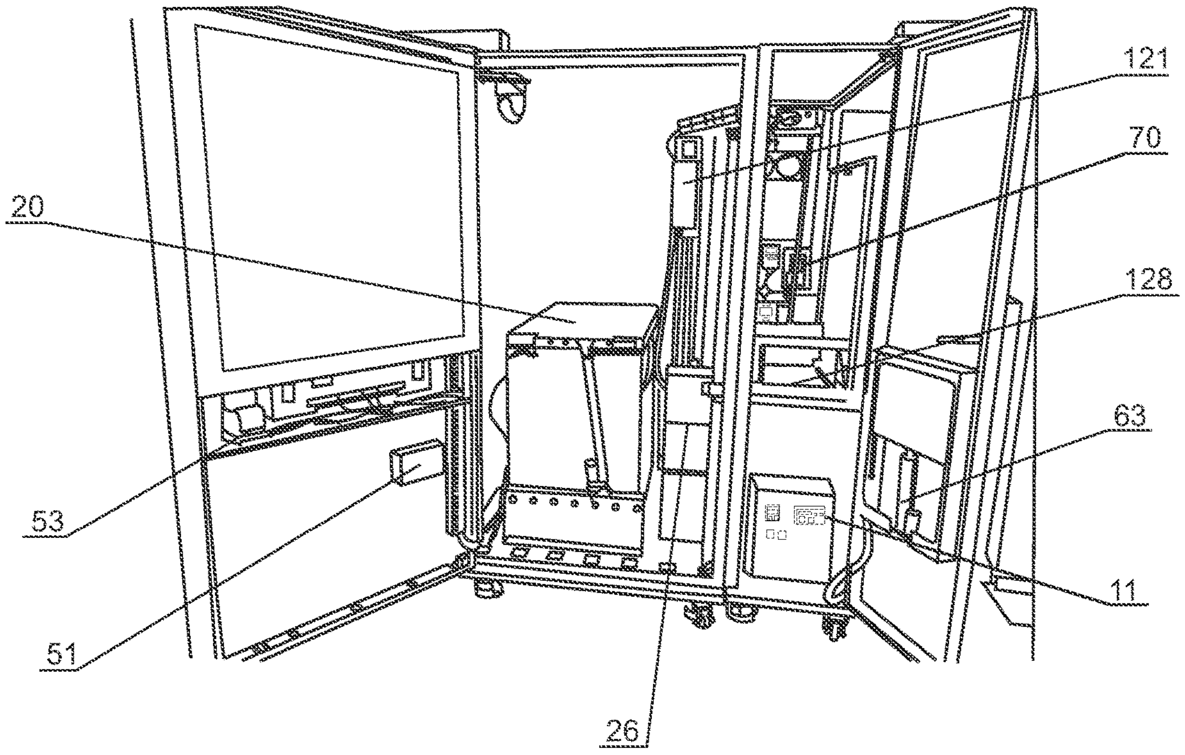
FIG. 5 is a side perspective view of the chest freezer embodiment of the present invention.

As seen in FIGS. 3-5, the vending machine operation begins with the advertising screen 102 which the user sees. The user also sees the light box 101 with the advertisement on the lightbox. The user can make a selection using the operation panel unit 51, or by the user's cell phone. The user can scan a QR code on the advertising screen 102 and access a cell phone app for ordering items through the communication module 90. The user application can be downloaded from Wi-Fi which could be selectively enabled just for installing the application on the user mobile device. Once a user purchases the product through the payment unit 50, the food package 88 is suctioned with a pick section tip 122 mounted on a picking arm 121. The refrigeration unit 20 is a chest freezer that holds the food package 88 which can be a hamburger.

The linear motor 27 pushes open the lid 24 at the hinge 25 and then the picking arm pics the food with a vacuum mounted to a vacuum tube inside the picking arm. The vacuum tube is powered during the picking process. After the food package 88 is suctioned, the picking arm raises and then swivels on a picking arm swivel 123. The picking arm passes the food package 88 through the partition door 74. The partition door 74 can be an insulated spring-loaded door that allows passage of the picking arm to drop the food into the heating chamber 31. The control unit 10 controls the picking arm so that the picking arm biases the partition door 74 open. The partition door 74 can be mounted on a partition door opening 75. The partition door opening 75 is formed on the isolation module 70 which can be a vertical plank of polyisocyanurate foam. The partition door 74 is also preferably insulated so as to keep the chest freezer and the heating unit thermally separate. The refrigeration unit 20 has a freezing unit sidewall 26 on which the linear motor 27 is mounted. The refrigeration unit 20 can further receive refrigeration by a refrigerator mounted in the lightbox area above the cooling side. The cooling side refrigeration can be a separate refrigeration system from the chest freezer. The cooling side refrigeration can be by evaporative cooling for example.

As seen in FIG. 4, the heating chamber 31 has a first magnetron 34, a second magnetron 35, a third magnetron 36 mounted to an external part of the heating ever 31. The heating chamber 31 also has a heating chamber front door 39 for removal of the food package after heating. Optionally, a heating chamber funnel 38 may allow magnetron concentration through a electromagnetically transparent flat plate 37 such as a glass flat plate. A fuse 11 protects against overheating and electrical shorts.

The first magnetron and second magnetrons can be mounted underneath the heating chamber with the third magnetron mounted behind the heating chamber. The first and second magnetrons can be mounted underneath the heating chamber funnel 38. The heating chamber funnel 38 is sized to provide a resonating power to the food package 88.

As seen in FIGS. 3 and 5, the conveyor belt 120 delivers the food package 88 to a pickup area 128. The pickup port 61 opens at a pickup port hatch 63. The pickup port 61 is mounted on a right door 71 and can be actuated by a right door linear motor which is noted to the right door and controlled by the control unit 10.

After dropping the food package 88 into the heating chamber 31, the control unit 10 sends the picking arm back to the cold side so as to minimize the thermal convective transfer between the hot side on the right and the cold side on the left.

In the description of the present invention, it is to be understood that the terms "upper", "lower", "front", "back", "left", "right", "top", "bottom", "inner", the orientation or positional relationship of the "outside" or the like is based on the orientation or positional relationship shown in the drawings, and is merely for the convenience of describing the present invention and the simplified description, and does not indicate or imply that the device or component referred to has a specific orientation. It is constructed and operated in a specific orientation and is therefore not to be construed as limiting the invention.

For those skilled in the art, the steps of the above control method can be deleted or sequentially adjusted as needed within the scope of the technical idea of the present invention. Those skilled in the art will appreciate that in the various embodiments described above, numerous technical details are set forth to provide the reader with a better understanding of the present application. However, even without these technical details and various changes and modifications based on the above embodiments, the technical solutions claimed in the claims of the present application can be substantially realized. Therefore, various changes in the above-described embodiments may be made in the form and details without departing from the spirit and scope of the invention.

The invention claimed is:

1. An automatic vending machine comprising:

a. a control unit;

b. a payment unit, wherein the payment unit is configured to receive payment from a user;

c. a refrigeration unit, wherein the refrigeration unit is a chest freezer having a top lid and a hinge, wherein the top lid is controlled by the control unit, wherein the top lid moves between an open position and a closed position;

d. a food package stored in the refrigeration unit;

e. a picking arm mounted on a picking arm swivel, wherein the picking arm has a pick suction tip that is vacuum driven, wherein the picking arm is controlled by the control unit;

f. a microwave heating unit, wherein the control unit is configured to control the picking arm to pick a food package from the refrigeration unit and move it to the microwave heating unit for heating; and g. a pickup area, wherein the food package moves to the pickup area after being heated, wherein the pickup area has a pickup port for dispensing to a user; wherein the refrigeration unit is mounted on a cold side and the microwave heating unit is mounted on a hot side, wherein the cold side and the hot side are separated by an isolation module, wherein the isolation module is formed as an insulated wall, wherein the insulated wall has a partition door opening formed through the insulated wall, wherein a partition door is mounted to the partition door opening, wherein the picking arm swivel is configured to send the food package through the partition door opening into the microwave heating unit.

2. The automatic vending device according to claim 1, wherein the partition door is spring-loaded and automatically closes after the food package passes through the partition door opening.

3. The automatic vending machine of claim 1, further including a communication unit, wherein the communication unit monitors the payment unit, refrigeration unit, microwave heating unit, the picking arm, and the control unit.

4. The automatic vending device according to claim 1, wherein the control unit sets the temperature of the refrigeration unit at less than or equal to −18° C.

5. The automatic vending device according to claim 1, wherein the microwave heating unit is formed with a closed microwave heating cavity, wherein the closed microwave heating cavity has set of magnetrons, wherein the set of magnetrons includes a first magnetron, a second magnetron and a third magnetron, wherein the total power of the three magnetrons is more than 3500 watts of power, wherein a microwave heating time is less than 60 seconds.

6. The automatic vending machine according to claim 1, wherein the control unit is configured to control the picking arm to not only automatically move the food package from the refrigeration unit to the microwave heating unit, but to also move the food package after heating to the pickup area.

7. The automatic vending machine according to claim 1, further including an ozone sterilization unit mounted inside the refrigeration unit.

8. The automatic vending machine according to claim 1, further including a pickup port hatch mounted over the pickup port, wherein the control unit is configured to control the pickup port hatch to open and close the pickup port hatch so as to reveal a pickup area.

9. The automatic vending device according to claim 1, wherein the hinge opens with a linear motor mounted on a freezing unit sidewall of the chest freezer, wherein the control unit is configured to control the motion of the linear motor.

* * * * *